(12) United States Patent
Le et al.

(10) Patent No.: US 7,978,430 B2
(45) Date of Patent: Jul. 12, 2011

(54) APPARATUS FOR PROVIDING A REVERSE AIR BEARING SURFACE HEAD WITH TRAILING SHIELD DESIGN FOR PERPENDICULAR RECORDING

(75) Inventors: Quang Le, San Jose, CA (US); James L. Nix, Gilroy, CA (US); Aron Pentek, San Jose, CA (US); Walter E. Weresin, San Jose, CA (US); Mason L. Williams, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 726 days.

(21) Appl. No.: 11/852,166

(22) Filed: Sep. 7, 2007

(65) Prior Publication Data
US 2008/0002292 A1    Jan. 3, 2008

Related U.S. Application Data

(62) Division of application No. 10/903,983, filed on Jul. 30, 2004, now Pat. No. 7,296,338.

(51) Int. Cl.
*G11B 5/127* (2006.01)
*G11B 5/147* (2006.01)
(52) U.S. Cl. .............................. 360/125.1; 360/125.03
(58) Field of Classification Search ............ 360/125.09, 360/125.1, 125.11, 125.13, 125.14, 125.15, 360/125.02, 125.03
See application file for complete search history.

(56) References Cited

U.S. PATENT DOCUMENTS

| | | | |
|---|---|---|---|
| 4,974,110 A | 11/1990 | Kanamine et al. | |
| 5,166,845 A | 11/1992 | Thompson et al. | |
| 5,455,730 A | 10/1995 | Dovek et al. | |
| 5,486,967 A | 1/1996 | Tanaka et al. | |
| 5,811,355 A | 9/1998 | Jordan | |
| 6,054,023 A * | 4/2000 | Chang et al. | 204/192.2 |
| 6,229,673 B1 | 5/2001 | Shinohara et al. | |
| 6,278,591 B1 * | 8/2001 | Chang et al. | 360/317 |
| 6,710,973 B2 * | 3/2004 | Okada et al. | 360/125.13 |
| 6,809,899 B1 * | 10/2004 | Chen et al. | 360/125.13 |
| 6,826,020 B2 * | 11/2004 | Daby et al. | 360/317 |
| 7,253,992 B2 * | 8/2007 | Chen et al. | 360/125.03 |
| 7,289,293 B2 * | 10/2007 | Aoyagi | 360/97.01 |
| 7,296,338 B2 * | 11/2007 | Le et al. | 29/603.16 |
| 7,322,095 B2 * | 1/2008 | Guan et al. | 29/603.07 |
| 7,359,151 B1 * | 4/2008 | Biesecker et al. | 360/125.01 |
| 7,606,006 B2 * | 10/2009 | Mochizuki et al. | 360/319 |

(Continued)

FOREIGN PATENT DOCUMENTS

JP    56074812    6/1981

(Continued)

OTHER PUBLICATIONS

English computer translation of JP10320720 (full citation above); pp. 1-7.*

(Continued)

*Primary Examiner* — Brian E Miller
(74) *Attorney, Agent, or Firm* — Merchant & Gould

(57) ABSTRACT

A method and apparatus for providing a reverse air bearing surface head with trailing shield design for perpendicular recording. A reverse air bearing surface head for perpendicular recording is provided with an inversed bevel shape to handle skew when recording data on a magnetic recording medium.

10 Claims, 13 Drawing Sheets

U.S. PATENT DOCUMENTS

| | | | |
|---|---|---|---|
| 7,639,452 B2 * | 12/2009 | Mochizuki et al. | 360/125.15 |
| 7,748,103 B2 * | 7/2010 | Allen et al. | 29/603.15 |
| 7,777,988 B2 * | 8/2010 | Guan et al. | 360/125.3 |
| 2003/0128469 A1 | 7/2003 | Pust et al. | |
| 2003/0137770 A1 | 7/2003 | Ueyanagi | |
| 2003/0151850 A1 * | 8/2003 | Nakamura et al. | 360/125 |
| 2004/0228033 A1 * | 11/2004 | Aoki et al. | 360/126 |
| 2005/0141137 A1 * | 6/2005 | Okada et al. | 360/122 |
| 2005/0219743 A1 * | 10/2005 | Guan et al. | 360/125 |
| 2005/0219747 A1 * | 10/2005 | Hsu et al. | 360/126 |
| 2005/0237665 A1 * | 10/2005 | Guan et al. | 360/125 |
| 2005/0241140 A1 * | 11/2005 | Baer et al. | 29/603.01 |
| 2006/0114606 A1 * | 6/2006 | Ide | 360/125 |
| 2006/0209459 A1 * | 9/2006 | Im et al. | 360/126 |
| 2007/0070543 A1 * | 3/2007 | Gunder et al. | 360/126 |
| 2007/0097548 A1 * | 5/2007 | Taguchi | 360/126 |
| 2007/0253107 A1 * | 11/2007 | Mochizuki et al. | 360/126 |
| 2007/0285837 A1 * | 12/2007 | Im et al. | 360/126 |
| 2008/0002292 A1 * | 1/2008 | Le et al. | 360/125 |

FOREIGN PATENT DOCUMENTS

| | | | |
|---|---|---|---|
| JP | 58091560 | | 5/1983 |
| JP | 58094163 | | 6/1983 |
| JP | 59218616 | | 12/1984 |
| JP | 60059517 | | 4/1985 |
| JP | 62080809 | | 4/1987 |
| JP | 29222 | | 2/1988 |
| JP | 4134610 | | 5/1992 |
| JP | 5046965 | | 2/1993 |
| JP | 5081619 | | 4/1993 |
| JP | 10320720 A | * | 12/1998 |
| JP | 11353618 | | 12/1999 |

OTHER PUBLICATIONS

"Thin Film Magnetic Heads", IBM Technical Disclosure Bulletin, May 1979, pp. 5002.

* cited by examiner

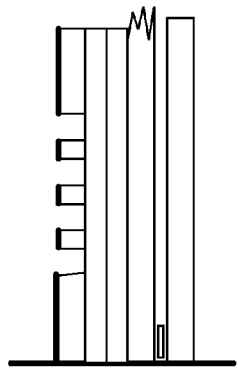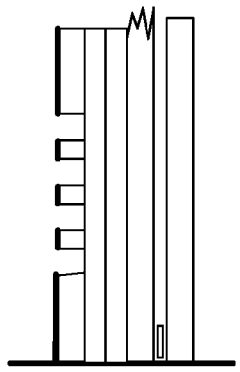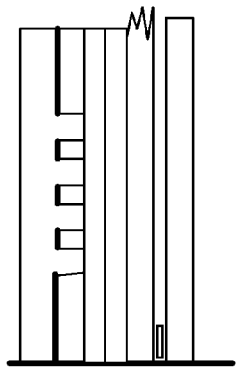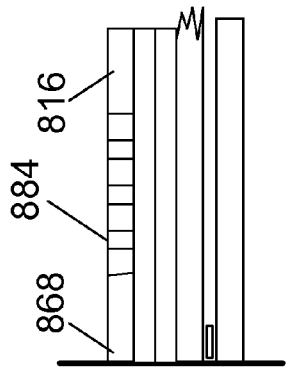
Fig. 8e  Fig. 8f  Fig. 8g  Fig. 8h
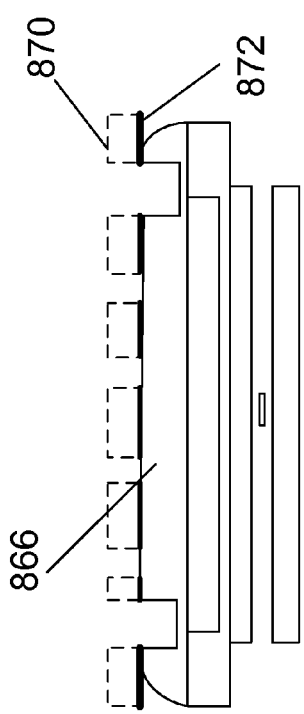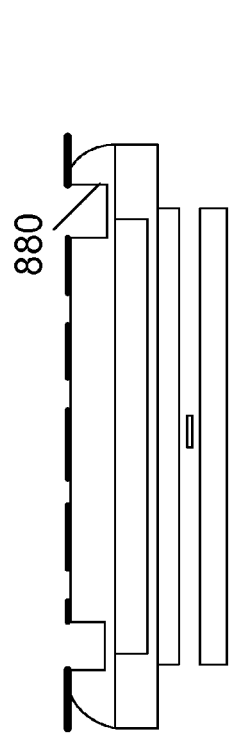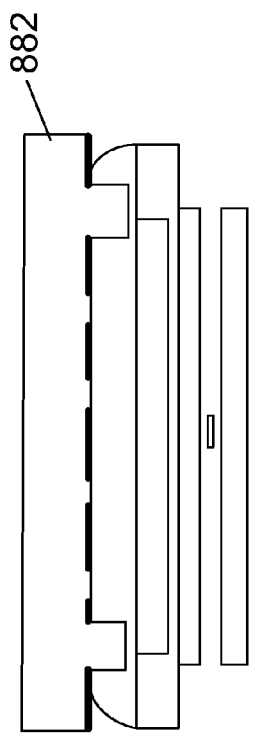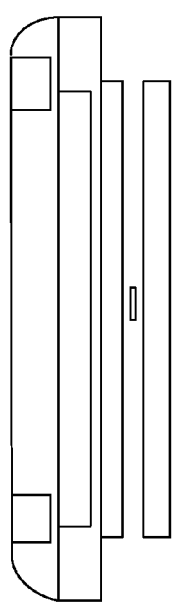
Fig. 8a  Fig. 8b  Fig. 8c  Fig. 8d

APPARATUS FOR PROVIDING A REVERSE AIR BEARING SURFACE HEAD WITH TRAILING SHIELD DESIGN FOR PERPENDICULAR RECORDING

BACKGROUND OF THE INVENTION

1. Field of the Invention

This disclosure relates in general to magnetic storage systems, and more particularly to a method and apparatus for providing a reverse air bearing surface head with trailing shield design for perpendicular recording.

2. Description of Related Art

Disk drives are used as primary data storage devices in modern computer systems and networks. A typical disk drive comprises one or more rigid magnetizable storage disks, which are rotated by a spindle motor at a high speed. An array of read/write heads transfer data between tracks of the disks and a host computer. The heads are mounted to an actuator assembly that is positioned so as to place a particular head adjacent the desired track.

Information is written on each disk in a plurality of concentric tracks by a transducer assembly mounted on an actuator arm. Typically, the transducer assembly is suspended over the disk from the actuator arm in a slider assembly, which includes air bearing surfaces designed to interact with a thin layer of moving air generated by the rotation of the disks. Transducer assemblies are said to "fly" over the disk surface as the disk rotates. To access tracks on the disk, the actuator arm moves in an arc across the disk. The physical distance between the nominal centers of two adjacent tracks is referred to as the "track pitch". The track pitch and linear track density define the storage capacity of the disk.

Each of the disks is coated with a magnetizable medium wherein the data is retained as a series of magnetic domains of selected orientation. The data are imparted to the data disk by a write element of the corresponding head. The data thus stored to the disk are subsequently detected by a read element of the head. Although a variety of head constructions have been utilized historically, magneto-resistive (MR) heads are typically used in present generation disk drives. An MR head writer uses a thin-film inductive coil arranged about a ferromagnetic core having a write gap. As write currents are passed through the coil, a magnetic write field is established emanating magnetic flux lines from the core and fringing across the write gap. The flux lines extend into the magnetizable medium to establish magnetization vectors in selected directions, or polarities, along the track on the data disk. Magnetic flux transitions are established at boundaries between adjacent magnetization vectors of opposite polarities.

To write a computer file to disk, the disk drive receives the file from the host computer in the form of input data that are buffered by an interface circuit. A write channel encodes and serializes the data to generate a data input stream that can be represented as a square-wave type signal of various lengths between rising and falling signal transitions.

A write driver circuit uses the data input stream to generate a write current which is applied to the write head, creating the magnetic write field that writes the encoded data to the magnetizable medium of the selected disk. The write current both reverses the polarity of the magnetic write field, creating the magnetic flux transitions, and sustains a given polarity between successive magnetic flux transitions.

A write head typically employs two ferromagnetic poles capable of carrying flux signals for the purpose of writing the magnetic impressions into the track of a magnetic disk or tape. The poles are fabricated on a slider with the pole tips located at the air bearing surface. Processing circuitry digitally energizes the write coil that induces flux signals into the poles. The flux signals bridge across the write gap at the air bearing surface so as to write the magnetic information into the track of the rotating disk. The thinner the thickness of the write gap layer, the greater the number of bits the write head can write into the track.

A write head is typically rated by its areal density that is a product of its linear bit density and its track width density. The linear bit density is the number of bits that can be written per linear inch along the track of the rotating magnetic disk and the track width density is the number of tracks that can be written per inch along a radius of the rotating magnetic disk. The linear bit density is quantified as bits per inch (BPI) and the track width density is quantified as tracks per inch (TPI). As discussed hereinabove, the linear bit density depends upon the thickness of the write gap layer. The track width density is directly dependent upon the width of the second pole tip at the ABS. Efforts over the years to increase the areal density of write heads have resulted in computer storage capacities increasing from kilobytes to megabytes to gigabytes.

For the past 40 years, longitudinal recording has been used to record information on a disc drive. In longitudinal recording, the magnetization in the bits on a disc is flipped between lying parallel and anti-parallel to the direction in which the head is moving relative to the disc.

In longitudinal recording, the magnetic medium on the disc is magnetized parallel to the surface of the disc. In perpendicular recording, however, the medium is magnetized perpendicular to the surface of the disc. According to perpendicular magnetic recording, a recording (write) magnetic field generated from a main pole of the head forms a magnetic path in which the magnetic field is induced to the underlayer disposed on the rear of the recording magnetic layer and returned from an auxiliary pole to the recording head. By switching the direction of recording magnetic field, the recording magnetic layer is magnetized in two directions towards the thickness of the medium in correspondence with the recording information code, thereby storing information. In such recording, an intensive and steep perpendicular recording (write) magnetic field can be applied to the recording magnetic layer, so that high-resolution information storage can be achieved. Moreover, when magnetized recording information is reproduced from the perpendicular magnetic recording medium recording the information, as described above, by the high-sensitive MR reproducing head using the MR device, a reproduced signal from the head has a rectangular-shaped signal waveform corresponding to the magnetized recording pattern which is sensed immediately by the head.

However, increasing areal densities to allow greater capacities is no small task. Today it is becoming more challenging to increase areal densities in longitudinal recording. Longitudinal magnetic recording is projected to be limited by the superparamagnetic limit at recording densities range between 80 to 200 Gbit/in2. To go to even higher areal densities, researchers are looking at several alternatives, including perpendicular recording. In recent years, the increased demand for higher data rate and areal density has correspondingly fueled the perpendicular head design to scale toward smaller dimensions and the need for constant exploration of new head designs, materials, and practical fabrication methods. Current exploratory head designs focus on developing a manufacturable fabrication process that uses similar design, materials, and existing tooling to ease the conversion from longitudinal to perpendicular recording to achieve ultra-high density. This aim has resulted in an effort to evaluate the current longitudinal head and consider approaches to modify its design for perpendicular recording.

Preliminary experimental evidence on head performance test on improved perpendicular media with high coercivity and tight switching field distribution indicate poor media saturation under the write pole when recording with the trailing edge of the write pole whereas substantial improvements are observed when recording is done on the leading edge. Lessons from these observations and the design of special reverse air bearing surface (ABS) suspension enable the longitudinal head to be suspended on reverse ABS, and flown them backward at zero skew. Results from flying longitudinal head backward (recording on leading edge) show improvements such as an increase in signal to noise ratio by 4-5 dB, a decrease in media transition noise by 30-50%, and elimination of poorly saturated media under the write pole. These improvements can be explained by looking at the flux path.

For a conventional single pole writer, the flux path is from the trailing edge of the write pole to the soft underlayer of the media and back to the return pole. The flux path takes the path of lowest reluctance and in this case it is the return pole. When the head is flown backward on special reverse ABS suspension, the flux is from the leading edge of the write pole to the soft underlayer of the recording media and back to the return pole. The major advantage observed from flying longitudinal head backward are mostly due to the improvement in write field gradient by the write pole's close proximity to the return pole and the direction of motion of the media in this design.

Using a conventional longitudinal head design and flying it backward for perpendicular recording requires designing a reverse ABS suspension and the development of an inverted bevel write pole fabrication to handle skew if a modified actuator arm adjusted for skew is not implemented.

It can be seen then that there is a need for a method and apparatus for providing a reverse air bearing surface head with trailing shield design for perpendicular recording.

SUMMARY OF THE INVENTION

To overcome the limitations described above, and to overcome other limitations that will become apparent upon reading and understanding the present specification, the present invention discloses a method and apparatus for method and apparatus for providing a reverse air bearing surface head with trailing shield design for perpendicular recording.

The present invention solves the above-described problems by providing a reverse air bearing surface head for perpendicular recording with an inversed bevel shape to handle skew when recording data on a magnetic recording medium.

A method for dynamically adjusting the write current in a write head in accordance with the principles of an embodiment of the present invention includes forming a return pole of a write head and forming a write pole for perpendicular recording having an inverse trapezoidal shape adjusted for skewing during writing.

In another embodiment of the present invention, a reverse air bearing surface head is provided. The reverse air bearing surface head includes a write pole and a return pole, wherein the write pole includes an inverted bevel surface.

In another embodiment of the present invention, a data storage system is provided. The data storage system includes a translatable recording medium for storing data thereon, a motor for translating the recording medium, a transducer disposed proximate the recording medium for reading and writing data on the recording medium and an actuator, coupled to the transducer, for moving the transducer relative to the recording medium and wherein the transducer includes a reverse air bearing surface head, the reverse air bearing surface head includes a write pole and a return pole, wherein the write pole includes an inverted bevel surface.

In another embodiment of the present invention, a reverse air bearing surface head is provided. The reverse air bearing surface head includes means for generating a magnetic flux for perpendicular recording on a magnetic medium and means for receiving return magnetic flux from the magnetic medium, wherein the means for generating a magnetic flux includes an inverted bevel surface.

In another embodiment of the present invention, a data storage system is provided. The data storage system includes means for storing data thereon, means for translating the means for storing data, means, disposed proximate the means for storing data, for reading and writing data on the means for storing data and means, coupled to the transducer, for moving the means for reading and writing data relative to the means for storing data and wherein the means for reading and writing data includes means for generating a magnetic flux for perpendicular recording on a magnetic medium and means for receiving return magnetic flux from the magnetic medium, wherein the means for generating a magnetic flux includes an inverted bevel surface.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIGS. 6a-h, 7a-h, 8a-h and 9a-d illustrate a method for fabricating a reverse ABS head with trailing shield design according to an embodiment of the present invention;

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for providing a reverse air bearing surface head with trailing shield design for perpendicular recording. An inversed bevel shape is provided for a reverse air bearing surface head for perpendicular recording to handle skew when recording data on a magnetic recording medium.

Figure 1:
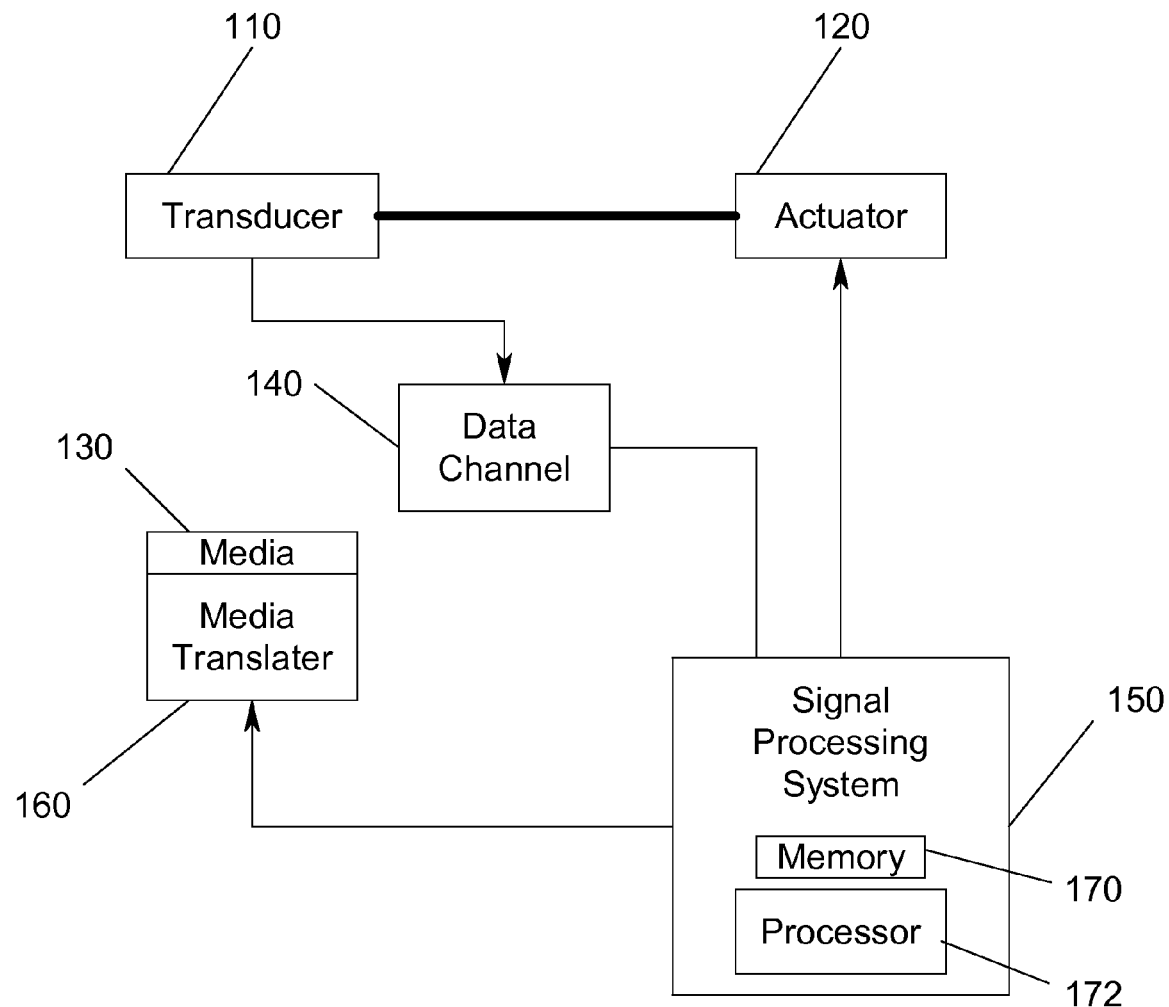
FIG. 1 illustrates a storage system according to an embodiment of the present invention.

FIG. 1 illustrates an exemplary storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
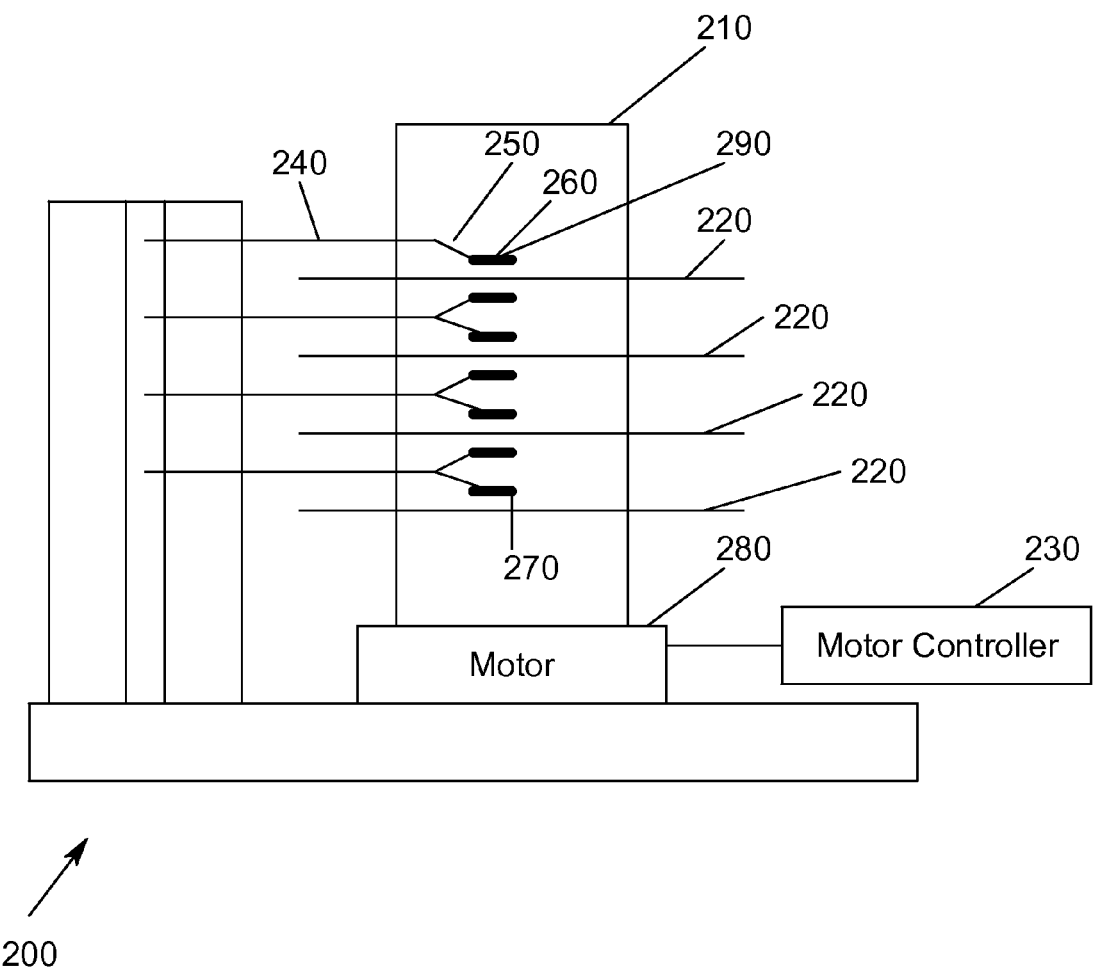
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 240 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 240 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

Figure 3:
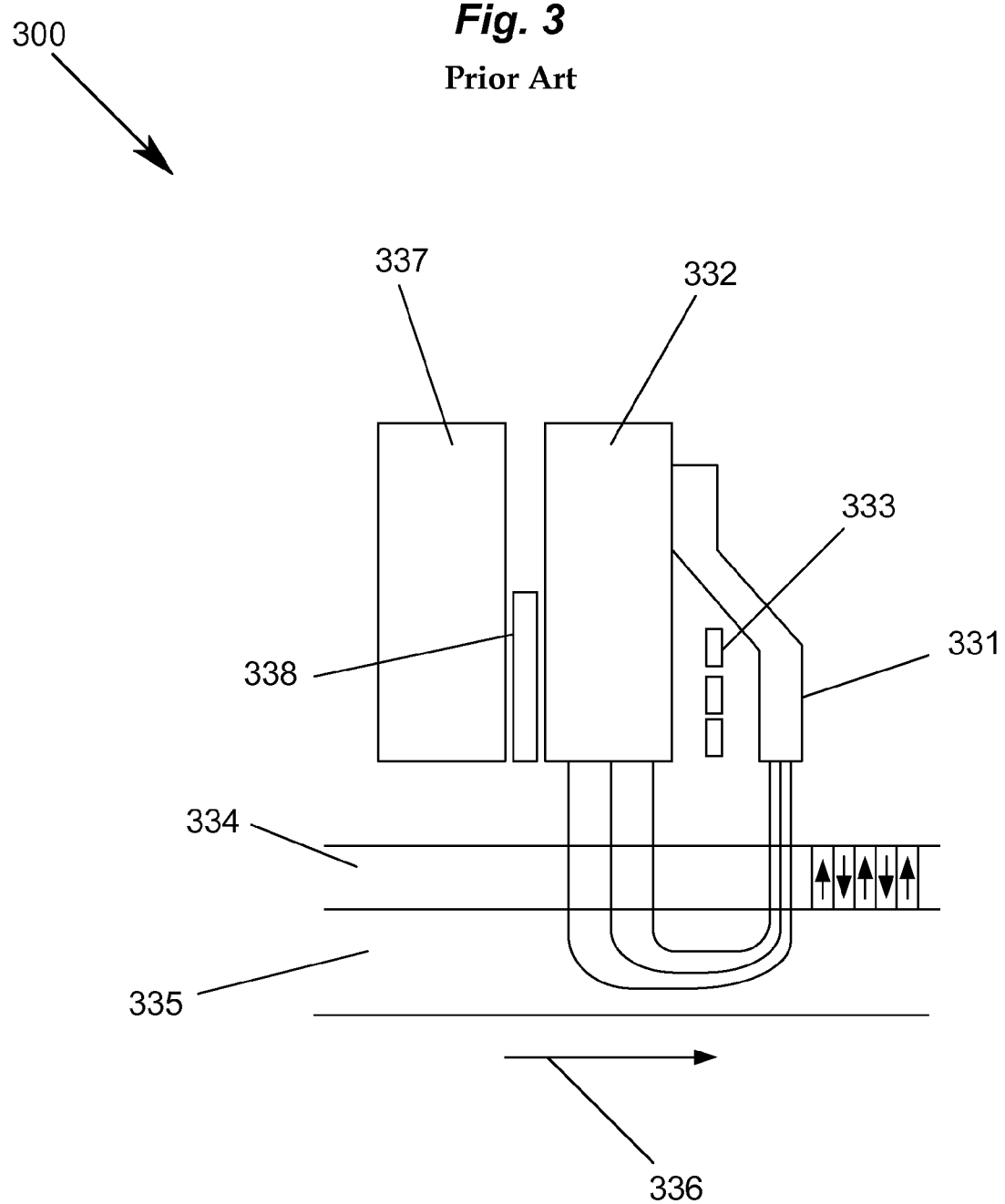
FIG. 3 is a schematic diagram showing the flow of a magnetic flux in the process of recording with a magnetic disk for perpendicular recording.

FIG. 3 is a schematic diagram 300 showing the flow of a magnetic flux between the head and medium in the perpendicular recording process. A recording (writing) head which is composed of a main pole 331, an auxiliary pole 332 and a coil 333 is facing a perpendicular recording medium having a recording layer 334 and a soft magnetic under layer 335. As a current is applied to excite the coil 333, a magnetic field is perpendicularly generated between the tip of the main pole and the soft magnetic under layer 335 so that recording is made in the recording layer 334 of the perpendicular recording medium. The magnetic flux which has reached the soft magnetic under layer 335 goes back to the auxiliary pole 332, making up a magnetic circuit. The recording magnetic field distribution depends on the shape of the main pole. It can be understood from the figure that writing is made through the main pole's end, which is on the trailing side in the medium moving direction 336. On the other hand, reading is made through a magnetoresistive effect element 338 located between the auxiliary pole 332 and a bottom shield 337.

As can be seen in FIG. 3 then, for a conventional single pole writer 300, the flux path is from the trailing edge of the write pole 331 to the soft underlayer 335 of the media and back to the return pole 332. The flux path takes the path of lowest reluctance and in this case it is the return pole 332. However, as described above, advantage may be observed by flying a longitudinal head backward due to the improvement in write field gradient.

Figure 4:
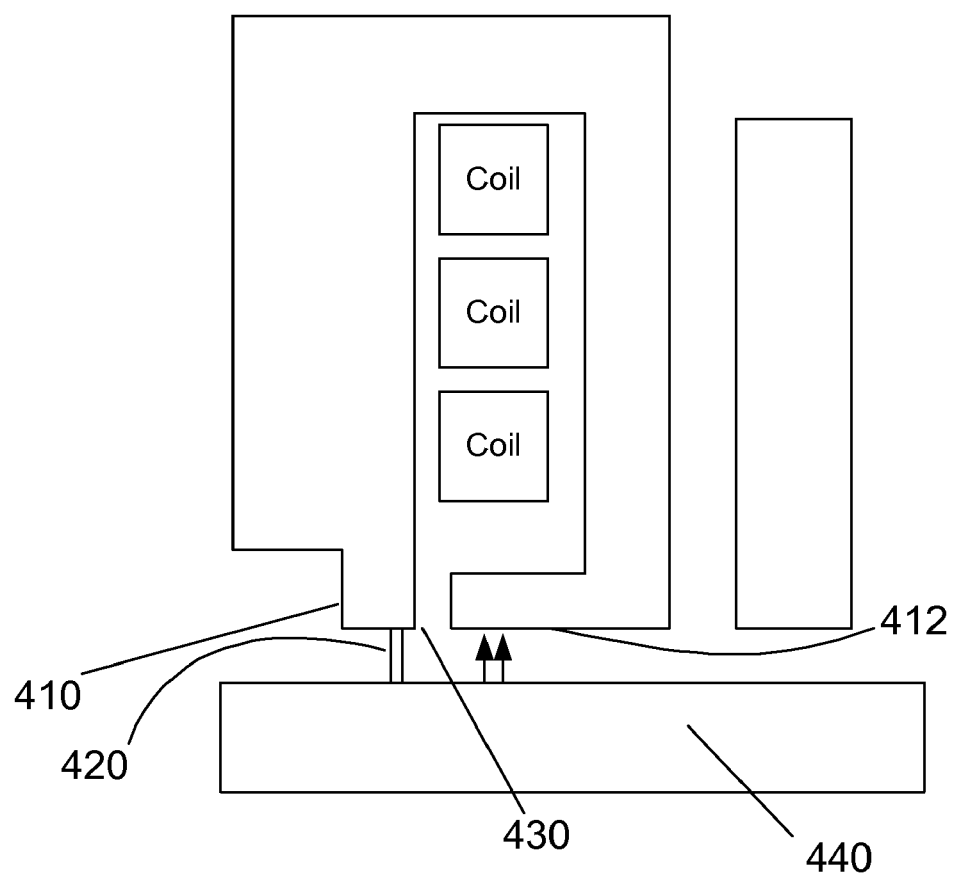
FIG. 4 is a schematic diagram 400 showing a reverse ABS single pole writer.

FIG. 4 is a schematic diagram 400 showing a reverse ABS single pole writer. In FIG. 4, a write pole 410 and a return pole 412 are shown. As can be seen in FIG. 4, when the head 400 is flown backward, the flux 420 is from the leading edge 430 of the write pole 410 to the soft underlayer of the recording media 440 and back to the return pole 412.

Figure 5:
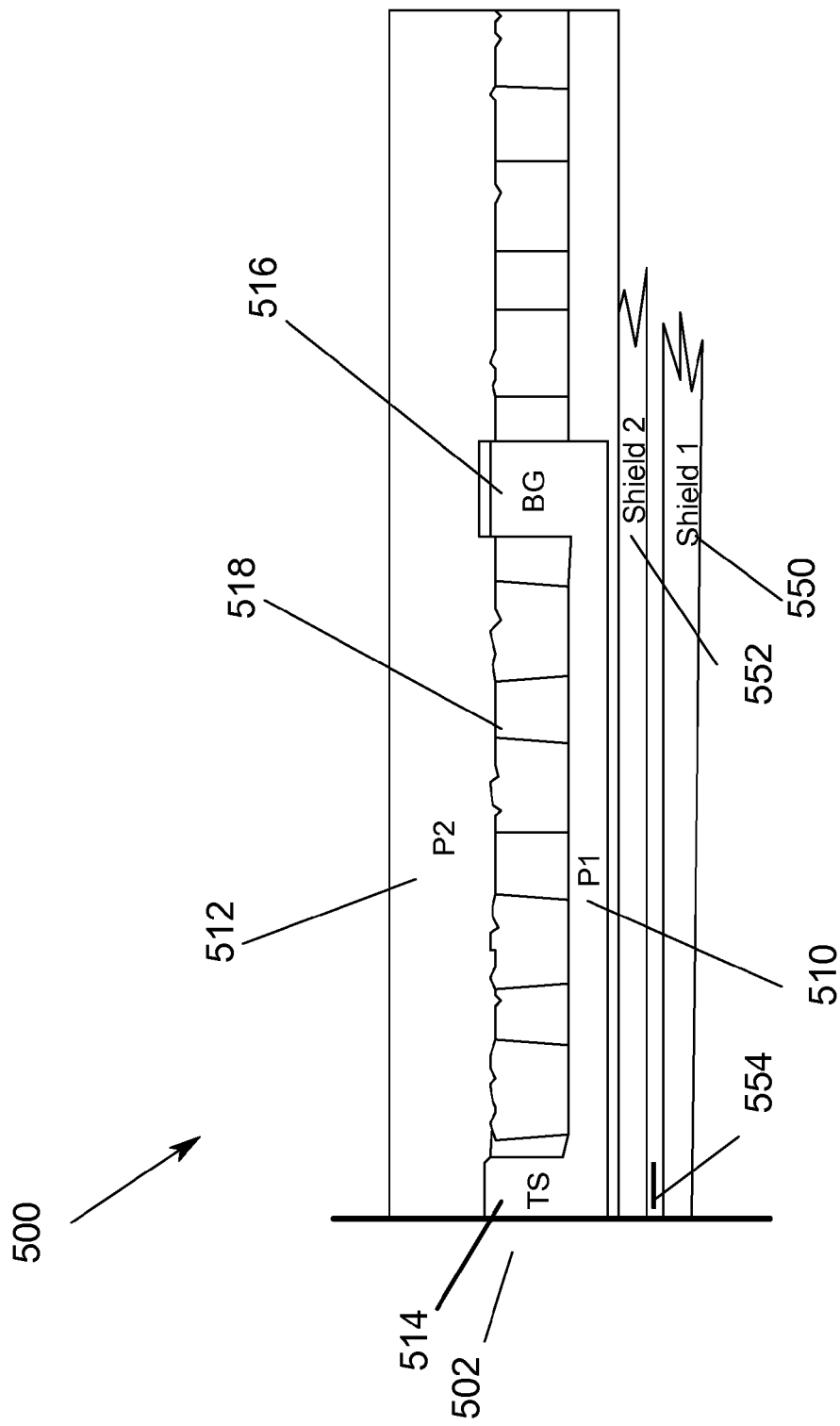
FIG. 5 illustrates a single coil layer design for a longitudinal head design according to an embodiment of the present invention.
Figure 6E:
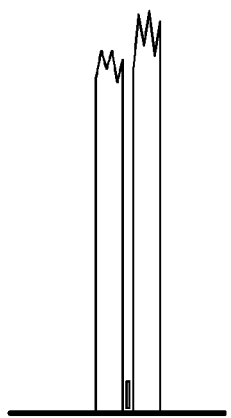
Figure 6F:
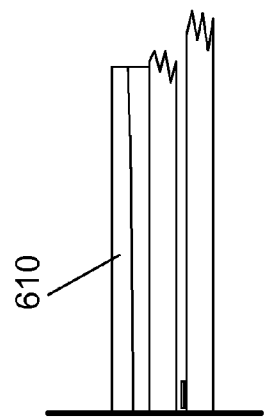
Figure 6G:
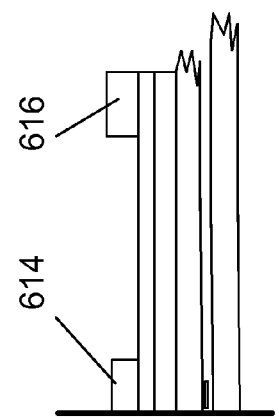
Figure 6H:
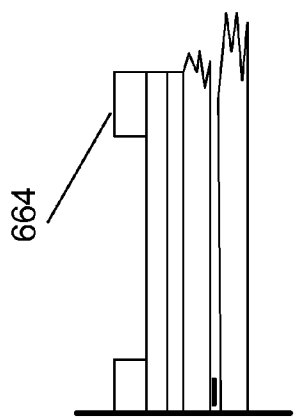
Figure 6A:
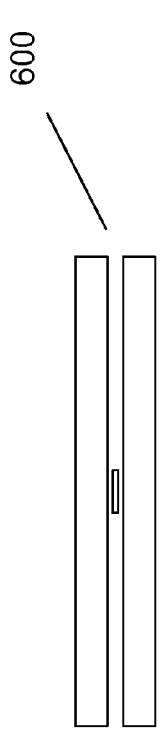
Figure 6B:
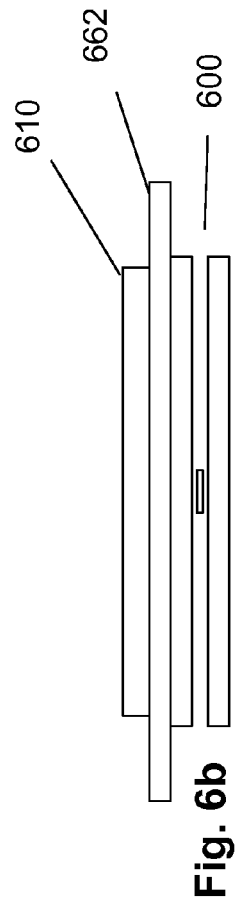
Figure 6C:
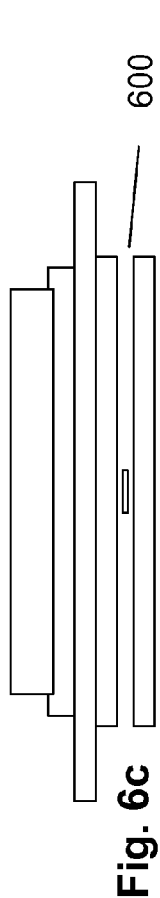
Figure 6D:
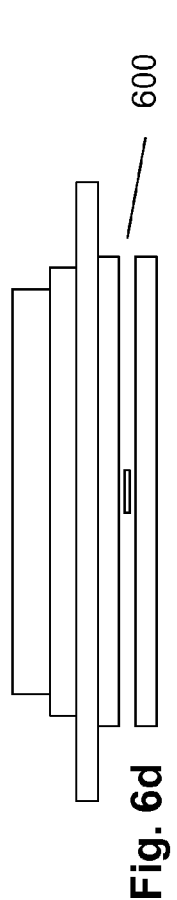
Figure 7A:
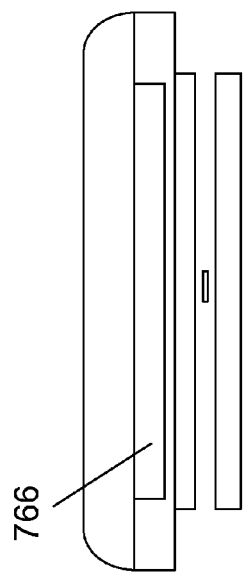
Figure 7B:
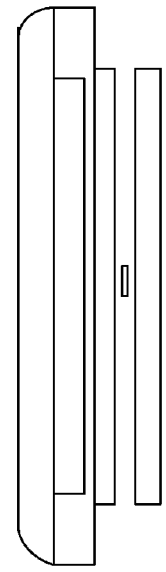
Figure 7C:
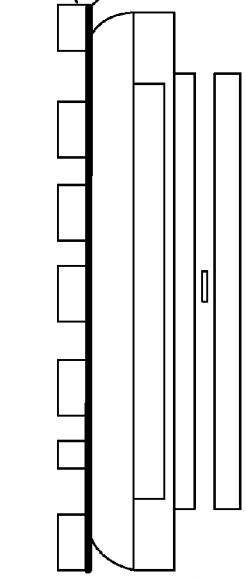
Figure 7D:
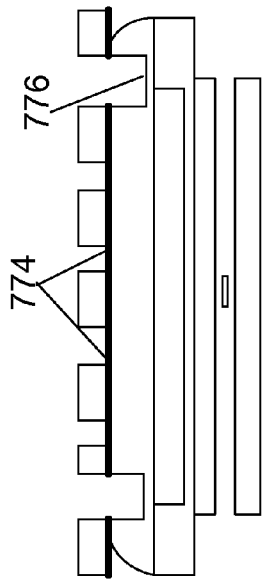
Figure 7E:
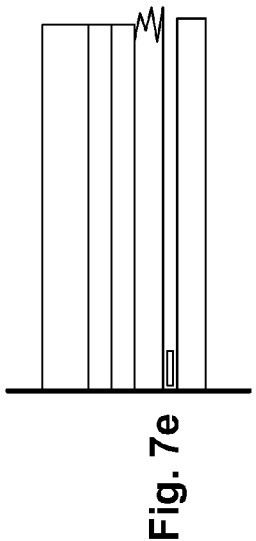
Figure 7F:
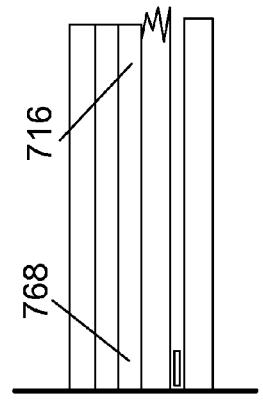
Figure 7G:
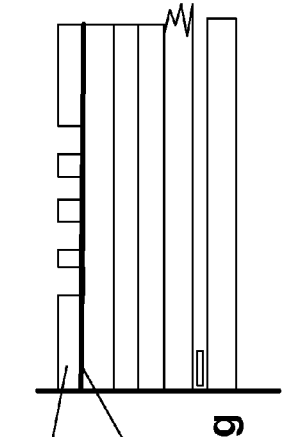
Figure 7H:
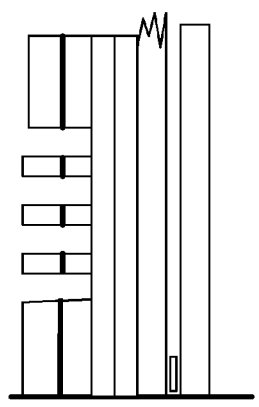
Figure 9C:
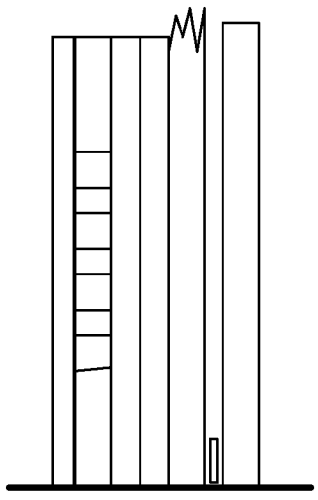
Figure 9D:
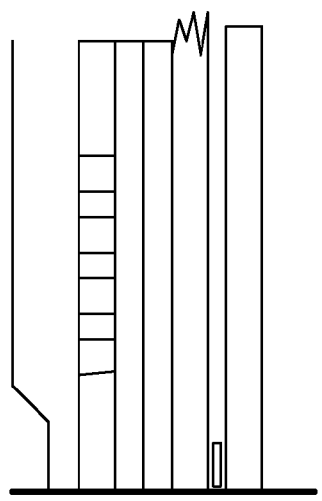
Figure 9A:
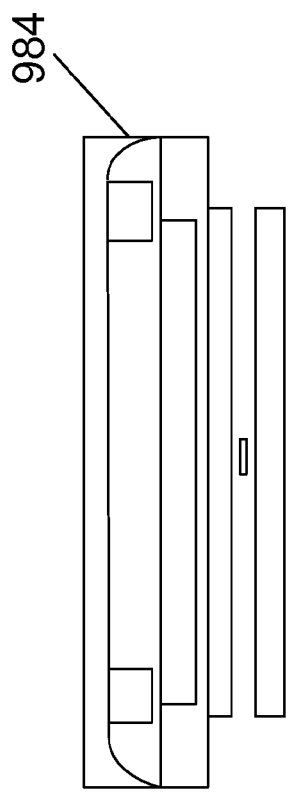
Figure 9B:
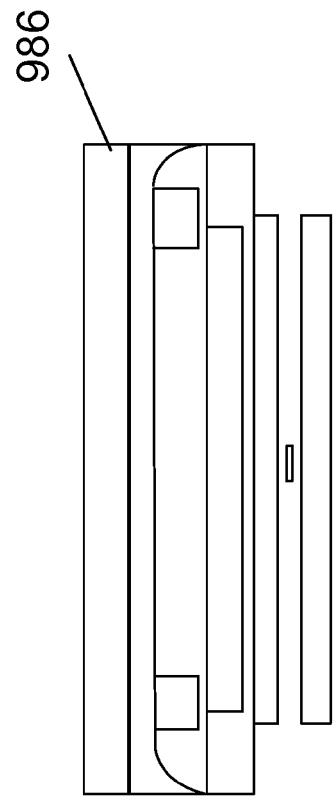

FIG. 5 illustrates a single coil layer design for a longitudinal head design 500 according to an embodiment of the present invention. In FIG. 5, two shield 550, 552 are shown surrounding a read sensor 554. The write head 502 including the first pole 510, second pole 512, trailing shield 514, backgap 516 and coils 520 are shown in FIG. 5. While the single coil layer design for a longitudinal head design 500 experiences flux leakage from the write pole 510 to the return pole 512 due mostly to a small separation, the height of trailing shield (TS) 514 and backgap (BG) 516 may be adjusted to minimize this effect. A reverse ABS suspension (not shown) may be use to fly the head backward.

FIG. 6-9 illustrates a method for fabricating a reverse ABS head with trailing shield design according to an embodiment of the present invention. Issues such as alignment scheme and the reader built first will be fabricated similar to a conventional longitudinal build sequence as shown. In addition, with the reader built first, issue such as annealing with a field in the hard axis direction to set the exchange bias will not affect the writer portion of the head since it is built later. The inverted bevel write head according to an embodiment of the present invention will be able to handle skew and tapering on top of the pole.

In FIG. 6, a read head 600 including a first 650 and second 652 shield is first built. Next, a separation gap 662 is deposited 662. Vias (B2) are opened (not shown) and then the return pole (P1) 610 is formed with connection to the reader 600. This structure is chemical mechanical polished. Then, the backgap 616 and trailing shield 614 are fabricated. The gap and open vias are deposited 664.

In FIG. 7, a hard bake resist 766 is spun on. The resist 766 is fully baked to fully cross link the resist. CMP is performed to planarize the hard bake resist 766. The endpoint is the top surface of the pedestal 768 and the backgap 716. After the CMP, a thin layer of $SiO_2$ 770 is deposited and an antireflective coating 772 is spun on. The resist is then imaged. Next, the pattern transferring of the coil image 774 into the $SiO_2$ hard mask 770 using, for example, reactive ion etching fluorine chemistry. Then, the pattern image in the oxide is transferred into the hard bake resist 776 using, for example, $H_2/N_2$.

In FIG. 8, the imaging resist 870 is stripped away, using for example hot NMP (N-Methyl-2-Pyrrolidone) solvent, to expose the oxide layer 866 and coating 872. Plating 880, such as Ta (for adhesion) and a copper seed layer, is deposited using, for example, collimated PVD (Physical Vapor Deposition). Damascene plating 882 is used to superfill and overplate the trenches with copper to define the coil 884. CMP is performed to remove excess copper. The endpoint is on the surface of the pedestal 868 and backgap 816. There are several methods to fabricate the coil and pedestal/backgap such as the approach described above. In another approach, the coil 884 can be fabricated before the pedestal 868 and backgap 816. In this approach, after fabrication of the return pole, a thin gap and copper seed layer is deposited before depositing the coil structure 884, performing seed-layer removal, and encapsulating the coil 884. The pedestal 868 and backgap 816 are then fabricated.

In FIG. 9, a thin layer of $Al_2O_3$ 984 and second pole 986 are deposited. The write pole may then be defined. A notched and un-notched trailing shield may be formed.

Figure 10A:
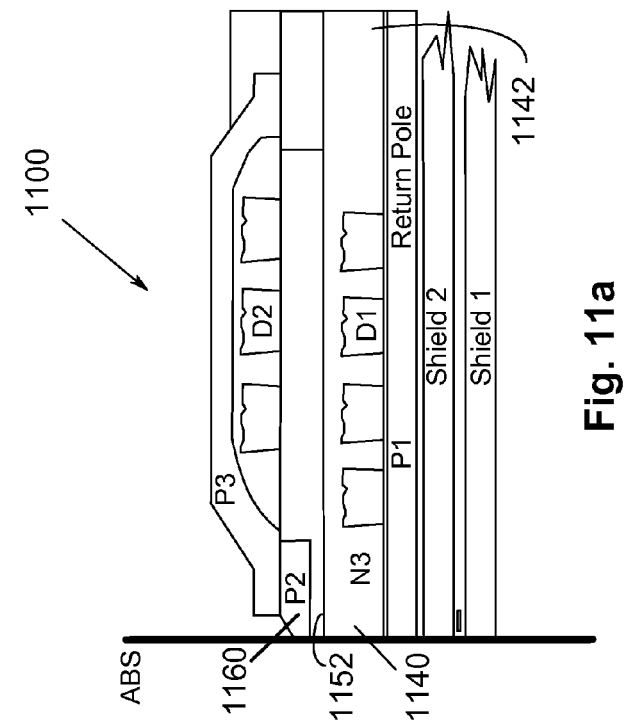
FIGS. 10a-b illustrate a notched trailing shield design according to an embodiment of the present invention.
Figure 10B:
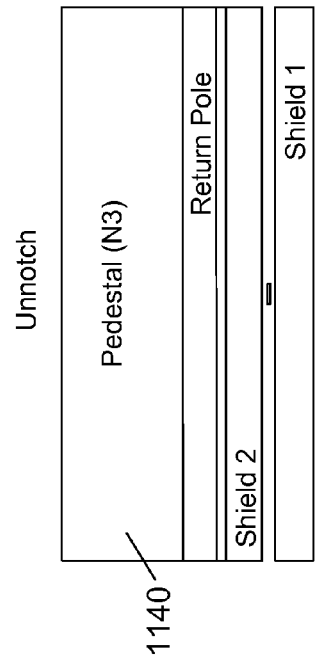

FIG. 10 illustrates a notched trailing shield design 1000 according to an embodiment of the present invention. In FIG. 10, the first shield 1010, second shield 1012 and read sensor 1014 are shown for the read head. A return pole 10200 is formed over the second shield 1012. The coil is formed between the return pole 1020 and pole 3 1030.

For notched trailing shield 1000, after CMP to expose the top of the pedestal 1040 and backgap 1042, a thin layer of high $B_s$ material is deposited to form notch 1050. A bi-layer photo resist is used to define the edge and dimension of the notch 1050. Ion mill is done to remove the bulk of the high $B_s$ material except material protected by a photoresist. Alumina is deposited to refill areas recessed by ion mill. Lift-off is done to remove excess alumina on top of the photoresist. The $B_s$ material and adjacent alumina should be at the same level. A slight CMP can be used to assist in the lift-off. At this point, the trailing shield gap 1052, such as alumina, is deposited follow by the fabrication of the trapezoidal write pole (P2) 1060. The notch 1050 is formed by extending the ion mill during the trapezoidal write pole 1060 formation so ion milling is used to define the high $B_s$ material to form the notch 1050.

Figure 11A:
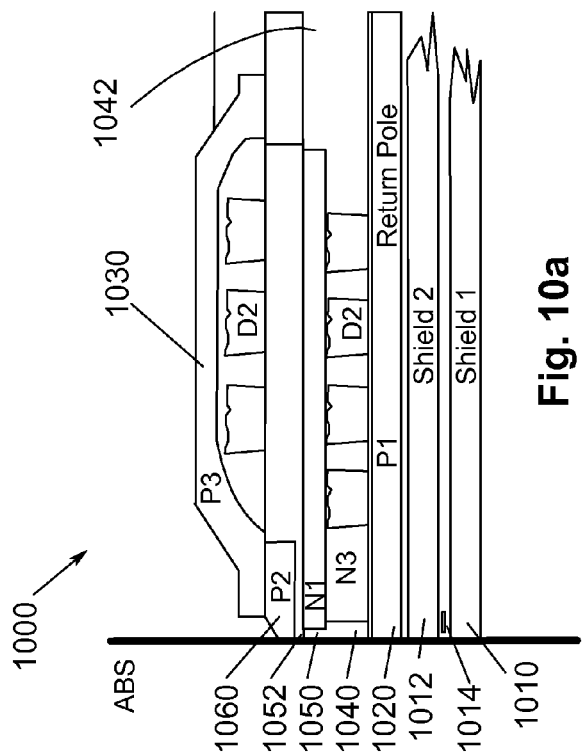
FIGS. 11a-b illustrate an un-notched trailing shield design according to an embodiment of the present invention.
Figure 11B:
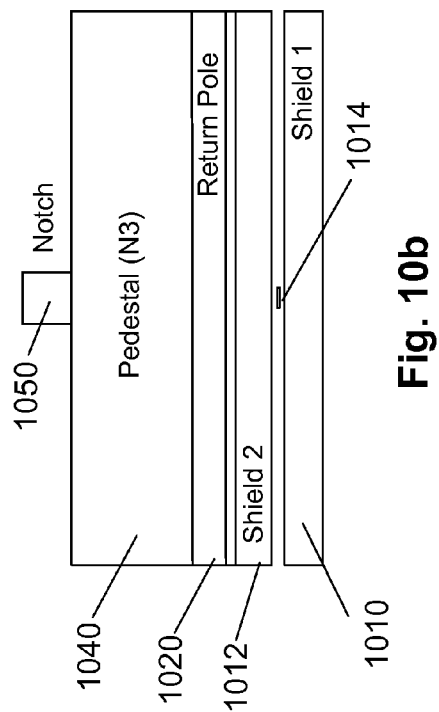

FIG. 11 illustrates an un-notched trailing shield design 1100 according to an embodiment of the present invention. For un-notched trailing shield, after CMP to expose the top of the pedestal 1140 and backgap 1142, the trailing shield gap 1152, such as alumina, is deposited follow by the fabrication of the trapezoidal write pole 1160.

Figure 12A:
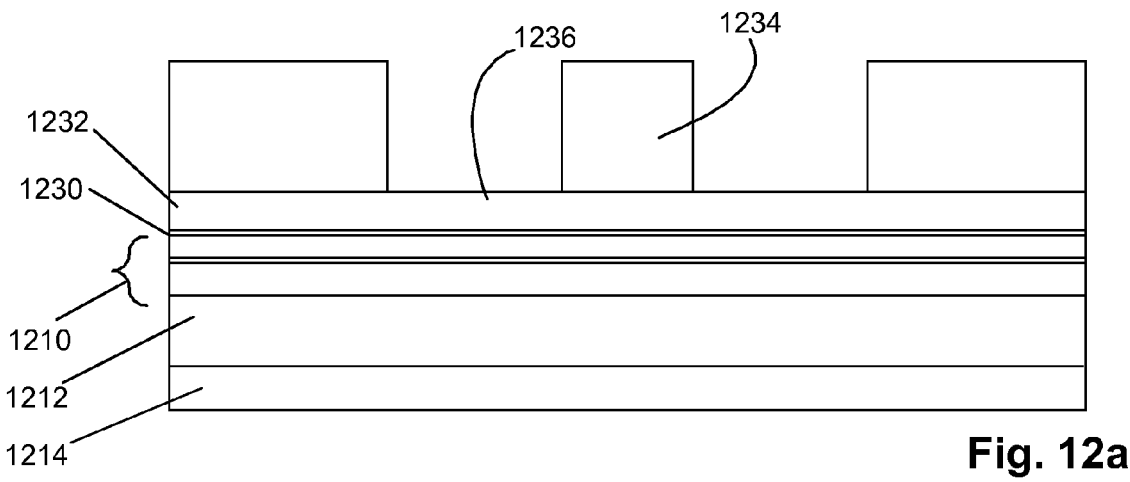
FIGS. 12a-c show the first steps for forming an inverse trapezoidal pole (P3) for perpendicular recording according to an embodiment of the present invention.
Figure 12B:
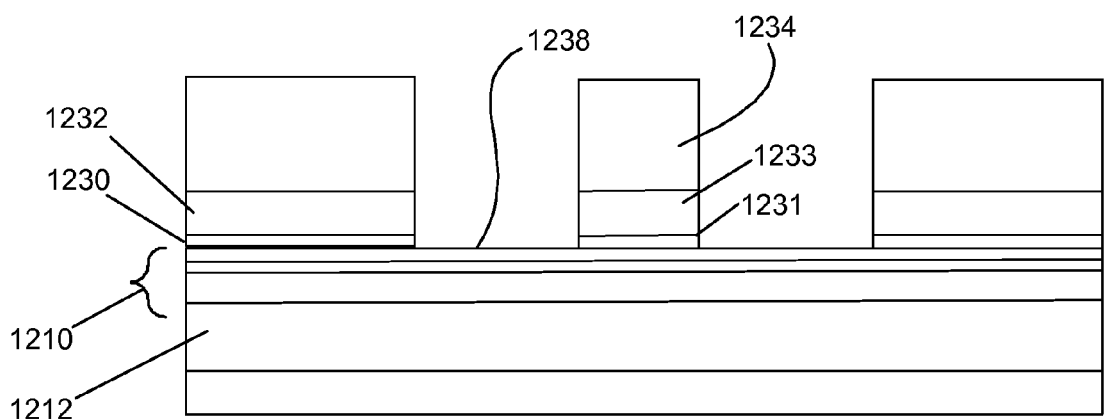
Figure 12C:
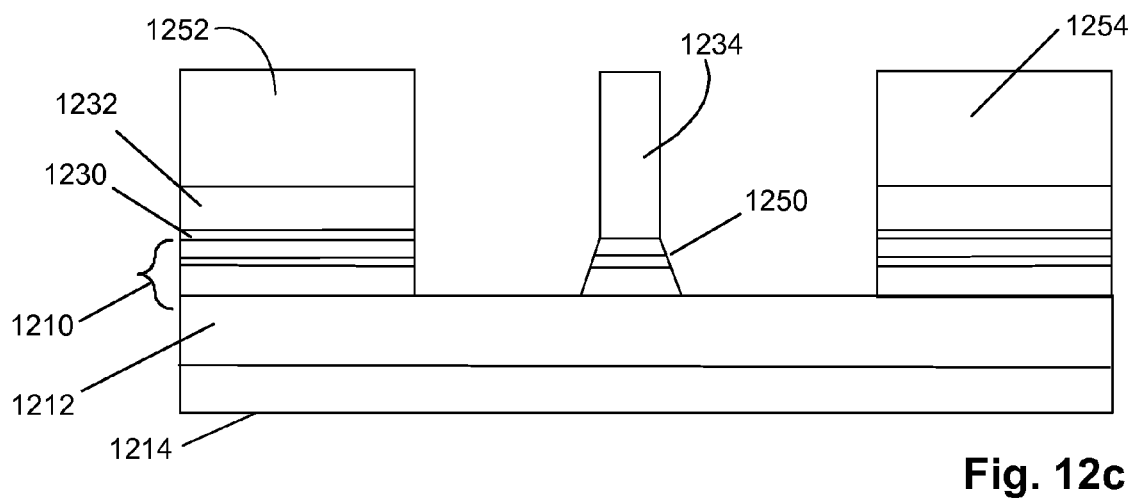

FIGS. 12*a-c* show the first steps for forming an inverse trapezoidal pole (P3) for perpendicular recording according to an embodiment of the present invention. In FIG. "12*a*, for fabricating the write pole and trailing edge taper (TET), lamination 1210 is deposited over the write gap material 1212, such as $Al_2O_3$, follow by an endpoint material such as Rh and high $B_s$, material. Write gap material 1212 is formed over return pole 1214. This is then follow by the stop layer 1230. The high $B_s$ material is used to provide the trailing edge taper. Rh is the endpoint material that is used during ion mill to create the trailing edge taper. Preferably, stop layer 1230 is carbon (C), but could be another suitable material such as rhodium (Rh) or ruthenium (Ru). A hard mask layer 1232 is then formed in full film over stop layer 1230. Hard mask layer 1232 may be made of polymide or epoxy, for example. Next, a central resist structure 1234 is formed over hard mask layer 1232 along the ABS. Preferably, central resist structure 1234 is made of a silicon-containing resist. The width of central resist structure 1234 is formed wider than the desired width of a pole tip to bevel and trim the write pole's trackwidth to be formed."

In FIG. 12*b*, exposed portions 1236 of hard mask layer 1232 and stop layer 1230 are then patterned in accordance with central resist structure and removed. The materials may be removed using etching techniques such as by RIE. Thus, a central hard mask 1233 and a central stop layer 1231 are formed underneath central resist structure 1234, such that top surfaces of pole tip materials outside central resist structure are exposed. Note that an additional layer may be deposited between hard mask layer and central resist structure to separate the RIE into two separate steps using different RIE chemistry for better selectivity. For example, the additional layer may be a RIEable material such as Ta, $Ta_2O_5$, $SiO_xN_y$, $SiO_2$, $Si_3N_4$, and $Ta_3N_5$, as examples, the first RIE chemistry may be based on fluorocarbon such as CF4/CHF3 as examples, and the second RIE chemistry may be based on $O_2$, $CO_2$, $NH_3/H_2$, or $H_2/N_2$ as examples.

FIG. 12*c* shows the result of performing ion milling over the central resist structure 1234 to remove exposed pole tip materials 1238 outside central resist structure 1234. A combination of shadowing effect is used to produce an inverted trapezoidal write pole 1250 underneath central resist structure 1234. In FIG. 12*c*, two frames 1252, 1254 are provided adjacent to the central resist structure 1234. The function of the two frames 1252, 1254 is to enhance the shadowing effort along with the ion mill process to produce the inverted trapezoidal write pole 1250.

Figure 13A:
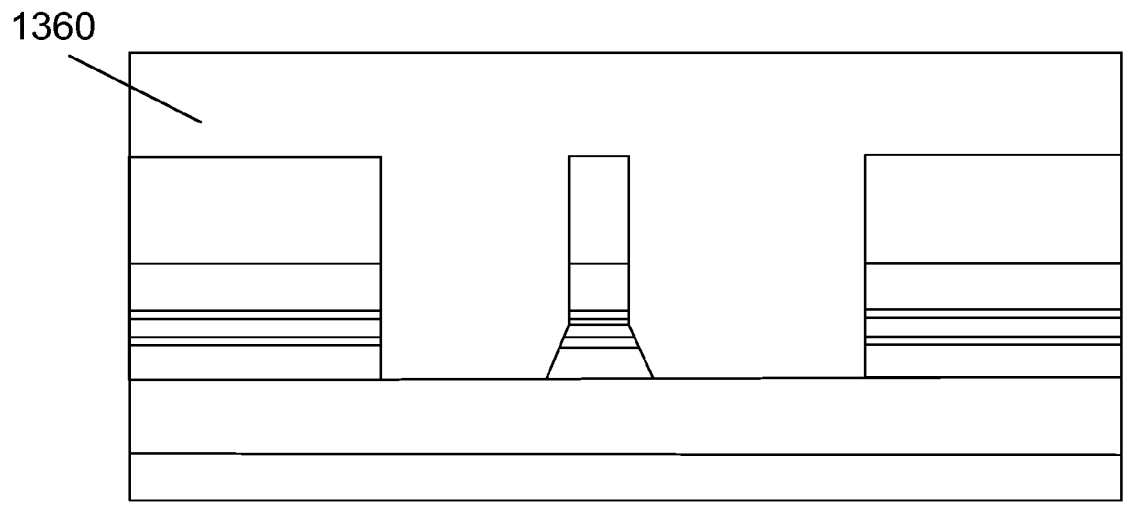
FIGS. 13a-c show the next series of steps for forming an inverse trapezoidal pole (P3) for perpendicular recording according to an embodiment of the present invention.
Figure 13B:
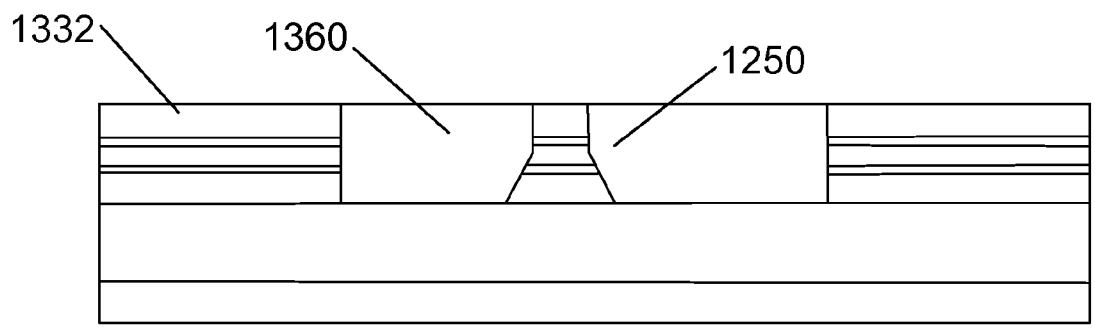
Figure 13C:
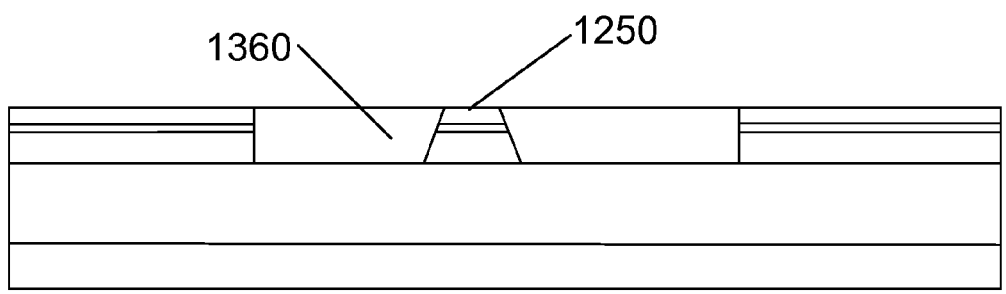

FIGS. 13*a-c* show the next series of steps for forming an inverse trapezoidal pole (P3) for perpendicular recording according to an embodiment of the present invention. FIG. 13*a* shows that, after ion milling, alumina 1360 may be used to refill above the height of the laminated write pole material. FIG. 13*b* shows the alumina 1360 CMP flat to expose the top of the write pole 1350. FIG. 13*c* shows the removal of the hardmask 1332. The yoke may then be fabricated and stitched to the trapezoidal write pole.

Figure 14B:
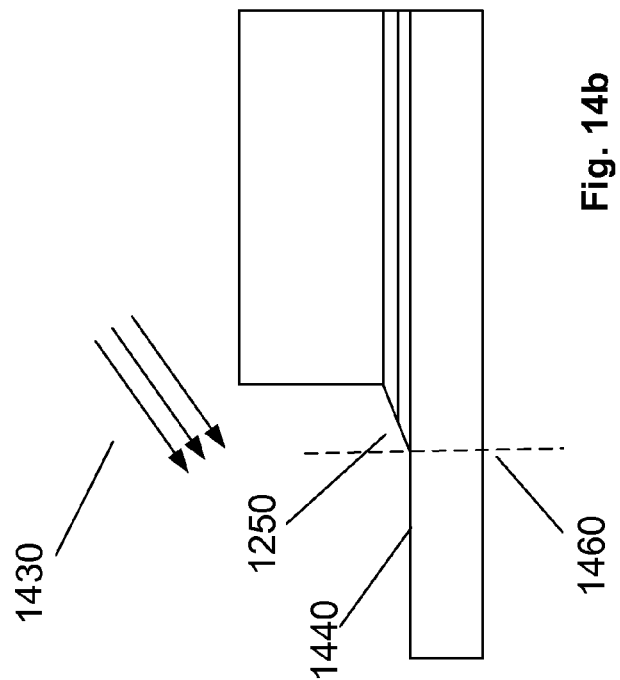
FIGS. 14a-b illustrate the fabrication of the trailing edge taper (TET) according to an embodiment of the present invention.
Figure 14A:
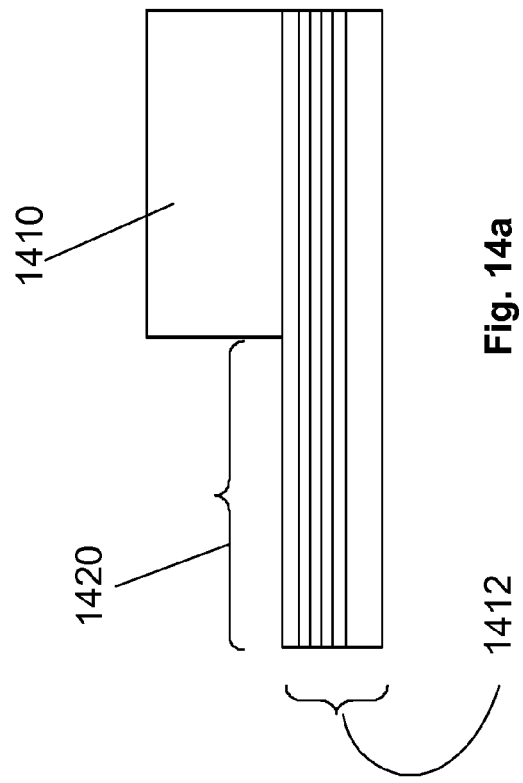

FIGS. 14*a-b* illustrate the fabrication of the trailing edge taper (TET) according to an embodiment of the present invention. FIG. 14*a* shows the yoke 1410 that is stitched to the inverted trapezoidal write pole. A resist (not shown) is applied to shape the yoke 1410. Placement of the yoke 1410 is used to define the throat 1420 of the trailing edge taper 1412. Photolithography is used to define the throat 1420 of the trailing edge taper 1412.

FIG. 14*b* shows formation of the trailing edge taper. Ion milling 1430 is to shape the trailing edge taper 1450. Ion milling 1430 is performed at an angle in one direction until the endpoint signal comes from the stop layer 1440, e.g., Rh. The width of trailing edge taper 1450 is the same as the write pole and when brought closer to the air bearing surface 1460 than the flare point will bring more flux to the pole tip while minimize adjacent track interference. Thus, the ion milling will end point on Rh layer 1440 as shown in FIG. 14*b* to shape the pole to the desired trapezoidal shape 1450.

Advantages of a reverse air bearing surface head with trailing shield design for perpendicular recording according to an embodiment of the present invention includes a decrease media transition noise by 30-50%, elimination of poorly saturated media under the write pole, improve saturation and an increase in signal to noise ratio by 4-5 dB.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A reverse air bearing surface head, comprising:
a write pole having a leading edge and a trailing edged disposed at an air bearing surface; and
a return pole having a leading edge and a trailing edged disposed at an air bearing surface, wherein the write pole includes an inverted bevel surface forming the leading edge of the write pole, the inverted bevel surface angled to narrow the write pole at the air bearing surface to reduce a distance between the leading edge of the write pole and the leading edge of the return pole and to widen the write pole along the leading edge in a direction away from the air bearing surface.

2. The reverse air bearing surface head of claim 1, further comprising a trailing shield disposed opposite the write pole.

3. The reverse air bearing surface head of claim 1, wherein the write pole comprises an inverse trapezoidal shape configured to compensate for skew during perpendicular recording.

4. The reverse air bearing surface head of claim 1, wherein the write pole having the inverted bevel surface is formed on $Al_2O_3$.

5. A data storage system, comprising:
a translatable recording medium for storing data thereon;
a motor for translating the recording medium;
a transducer disposed proximate the recording medium for reading and writing data on the recording medium; and
an actuator, coupled to the transducer, for moving the transducer relative to the recording medium; and
wherein the transducer comprises a reverse air bearing surface head, comprising:
a write pole having a leading edge and a trailing edged disposed at an air bearing surface; and
a return pole having a leading edge and a trailing edged disposed at an air bearing surface, wherein the write pole includes an inverted bevel surface forming the leading edge of the write pole, the inverted bevel surface angled to narrow the write pole at the air bearing surface to reduce a distance between the leading edge of the write pole and the leading edge of the return pole and to widen the write pole along the leading edge in a direction away from the air bearing surface.

6. The data storage system of claim 5, further comprising a trailing shield disposed opposite the write pole.

7. The data storage system of claim 5, wherein the write pole comprises an inverse trapezoidal shape configured to compensate for skew during perpendicular recording.

8. The data storage system of claim 5, wherein the write pole having the inverted bevel surface is formed on $Al_2O_3$.

9. A reverse air bearing surface head, comprising:
means for generating a magnetic flux for perpendicular recording on a magnetic medium having a leading edge and a trailing edged disposed at an air bearing surface; and
means for receiving return magnetic flux from the magnetic medium having a leading edge and a trailing edged disposed at an air bearing surface, wherein the means for generating a magnetic flux includes an inverted bevel surface forming the leading edge of the means for generating a magnetic flux, the inverted bevel surface angled to narrow the means for generating a magnetic flux at the air bearing surface to reduce a distance between the leading edge of the means for generating a magnetic flux and the leading edge of the means for receiving return magnetic flux and to widen the means for generating a magnetic flux along the leading edge in a direction away from the air bearing surface.

10. A data storage system, comprising:
means for storing data thereon;
means for translating the means for storing data;
means, disposed proximate the means for storing data, for reading and writing data on the means for storing data; and
means, coupled to the transducer, for moving the means for reading and writing data relative to the means for storing data; and
wherein the means for reading and writing data comprises:
means for generating a magnetic flux for perpendicular recording on a magnetic medium having a leading edge and a trailing edged disposed at an air bearing surface; and
means for receiving return magnetic flux from the magnetic medium having a leading edge and a trailing edged disposed at an air bearing surface, wherein the means for generating a magnetic flux includes an inverted bevel surface forming the leading edge of the means for generating a magnetic flux, the inverted bevel surface angled to narrow the means for generating a magnetic flux at the air bearing surface to reduce a distance between the leading edge of the means for generating a magnetic flux and the leading edge of the means for receiving return magnetic flux and to widen the means for generating a magnetic flux along the leading edge in a direction away from the air bearing surface.

* * * * *